(12) United States Patent
Kulakowski et al.

(10) Patent No.: US 6,279,136 B1
(45) Date of Patent: Aug. 21, 2001

(54) ERROR CORRECTION CODE SYSTEM WHICH INHIBITS THE TRANSFER OF PADDED SECTORS

(75) Inventors: John Edward Kulakowski; Rodney Jerome Means; Daniel James Winarski, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/432,386

(22) Filed: Nov. 1, 1999

Related U.S. Application Data

(62) Division of application No. 08/801,337, filed on Feb. 19, 1997, now Pat. No. 6,119,201.

(51) Int. Cl.[7] .................................................. G06F 11/08
(52) U.S. Cl. ........................ 714/769; 714/770; 714/768; 714/52; 710/65; 711/112
(58) Field of Search .............................. 714/52, 768, 769, 714/770; 711/111, 154, 112, 163; 712/300; 710/65, 30, 39, 57, 68; 369/97, 53, 60, 124

(56) References Cited

U.S. PATENT DOCUMENTS

| 4,495,623 | * | 1/1985 | George et al. | 714/755 |
| 5,150,465 | * | 9/1992 | Bush et al. | 710/14 |

* cited by examiner

Primary Examiner—B. James Peikari
(74) Attorney, Agent, or Firm—John H. Holcombe; Robert M. Sullivan

(57) ABSTRACT

In an optical data storage device for storing data on a removable optical disk in a continuous sequence of sectors or blocks, the input data buffer includes an ECC process. A padding provider is disclosed which is responsive to an under-run indication for providing padding characters for formatting the storage into sectors. The sectors may be provided with headers indicating the "padding sectors". A reading device for reading the data sectors and providing the data to a host detects padding and prevents the padding data from being transmitted to the host.

2 Claims, 4 Drawing Sheets

| POS | +0 | +1 | +2 | +3 | SIZE |
|---|---|---|---|---|---|
| 0 | SYNC | | | | 12 |
| 12 | ADDRESS | | | MODE | 4 |
| 16 | SUB- | | | | 8 |
| 20 | HEADER | | | | |
| 24 | USER DATA | | | | 2048 |
| 2072 | EDC | | | | 4 |
| 2076 | ECC | | | | 276 |

TOTAL: 2352

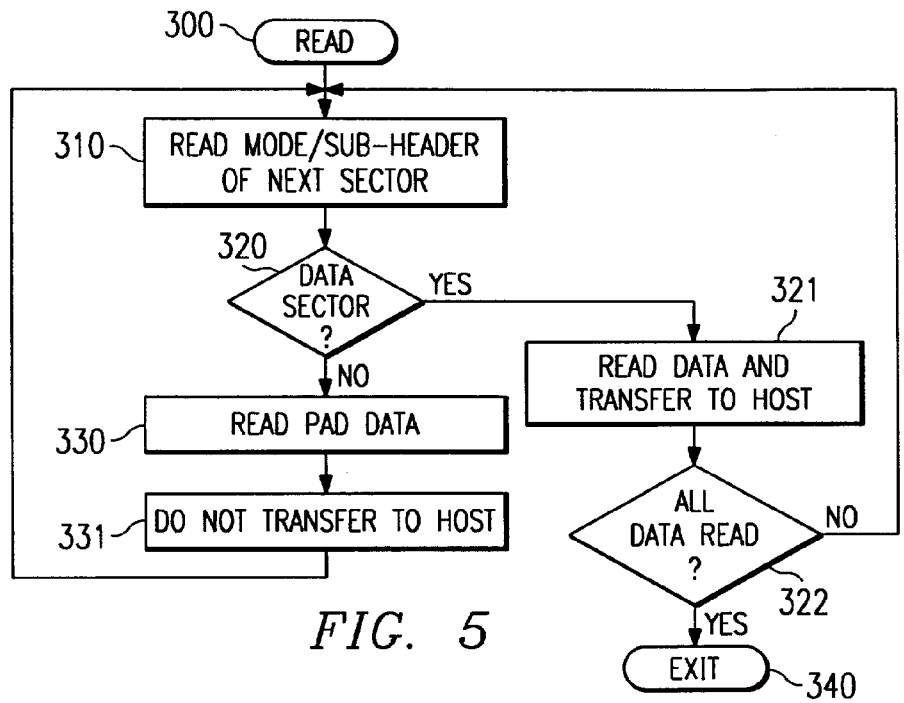
FIG. 5
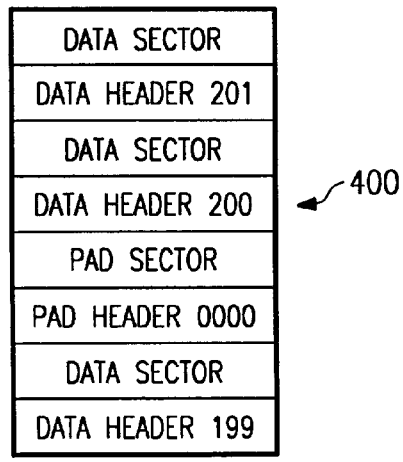
FIG. 6
| BYTE | 7 | 6 | 5 | 4 | 3 | 2 | 1 | 0 |
|---|---|---|---|---|---|---|---|---|
| 0 | PAD | RESERVED | | | | | | |
| 1 | PAD SECTOR DEFINITION | | | | | | | |
| 2 | MAXIMUM NUMBER OF PAD SECTORS (LSB) | | | | | | | |
| 3 | MAXIMUM NUMBER OF PAD SECTORS (MSB) | | | | | | | |
FIG. 7

ERROR CORRECTION CODE SYSTEM WHICH INHIBITS THE TRANSFER OF PADDED SECTORS

DOCUMENT INCORPORATED BY REFERENCE

This is a Divisional application of Ser. No. 08/801,337, filed Feb. 19, 1997, now U.S. Pat. No. 6,119,201.

U.S. Pat. No. 5,185,732, Ogawa et al., is incorporated for its showing of the prior art format of optical disk data sectors which are stored in a continuous sequence.

TECHNICAL FIELD

This invention relates to the storage of data in a continuous sequence of sectors, and more particularly to the protection against under-run of the data being organized in a buffer for storage in sectors or blocks of data.

BACKGROUND OF THE INVENTION

Optical disk media typically comprise a continuous spiral groove which extends for the entire data storage capacity of the disk. CD-based (CD-R or DVD-R) optical disk media architecture utilizes the continuous spiral groove with sectors (also called "blocks") of equal length, which are accessed at a constant linear velocity (CLV). Thus, there are a greater number of sectors along the outer tracks of the spiral than at the inner tracks of the spiral.

Herein, the terms "block" and "sector" are used interchangeably.

The CD-R (CD-recordable) optical disk media is CD-based and comprises a continuous spiral CLV media. The coding modulation for CD-R is called "EFM", which means eight-to-fourteen modulation. The encoding turns the input data, along with error correction data, address information, synchronization patterns, and other miscellaneous content, into an encoded binary stream of bits, expanding every eight bits of input data into fourteen, with an additional three bits to separate words, as is well known in the art. In the CD-R format, 24 of the resultant 17 bit symbols are assembled into a frame. 98 frames are grouped together to form a sector. A layered level of error correction is accomplished on a "diamond" or combined lateral and slant pattern across the frames to avoid the total loss of a frame of data, as is known in the art. Thus, each sector comprises a totality of 98 frames of data, together with a sector header, synch information and layered ECC distributed across the frames and sectors. The CD-R media does not provide molded sector or block identification marks to identify data recording positions. The sectors are therefore formatted with headers having a great deal of information to aid in synchronizing the rotation of the disk and obtaining data framing, comprising a great deal of overhead. A limited number of entries may be placed in the table of contents on the disk for locating the beginning of recorded areas. Therefore, it is very important for CD-R to not interrupt the data writing process because of this overhead penalty.

Current CD-R devices therefore have a buffer to accumulate the input data to organize the data into sectors for writing on the disk in a continuous sequence of sectors.

When the current buffer of a CD-R device fails to receive input data from the host on a timely basis (due to higher priority tasks or interrupts using host resources), the buffer may under-run and will become empty, causing the writing process to be halted in an orderly fashion, resulting in a data file being partially written. One proposed solution, which is undesirable, is to stop writing sectors upon the occurrence of the under-run. This is because in CD-R devices, it is not possible to restart the writing process without incurring the space and table of contents overhead, and it results in a disk having the appearance of two-recorded files. Most often, the user application cannot deal with the complexity or with the two data files where one is expected, so the disk is considered ruined and discarded.

What is needed is a means for protecting the recording of the optical disk against under-run of the input data to the buffer.

SUMMARY OF THE INVENTION

In an optical data storage device for storing data on a removable optical disk in a continuous sequence of sectors, having a buffer for buffering the input data, which buffer may be subject to under-run, under-run protection is provided by an under-run detector responsive to the buffered data comprising less than a sector of data for indicating an under-run, and a padding provider responsive to the under-run indication for providing padding signals for formatting into sectors. The sectors may be provided with headers indicating the sectors as padding. A reading device for reading the data sectors and providing the data to a host detects padding data and prevents the padding data from being transmitted to the host.

For a fuller understanding of the present invention, reference should be made to the following detailed description taken in conjunction with the accompanying drawings.

BRIEF DESCRIPTION OF THE DRAWINGS

FIG. 5 is a flow chart depicting the read process of the present invention;

FIG. 6 is an illustration of a sequence of sectors of an alternative embodiment of the present invention; and FIG. 7 is an illustration of a command for implementing the present invention in the optical disk of FIG. 3.

DETAILED DESCRIPTION OF THE INVENTION

Figure 1:
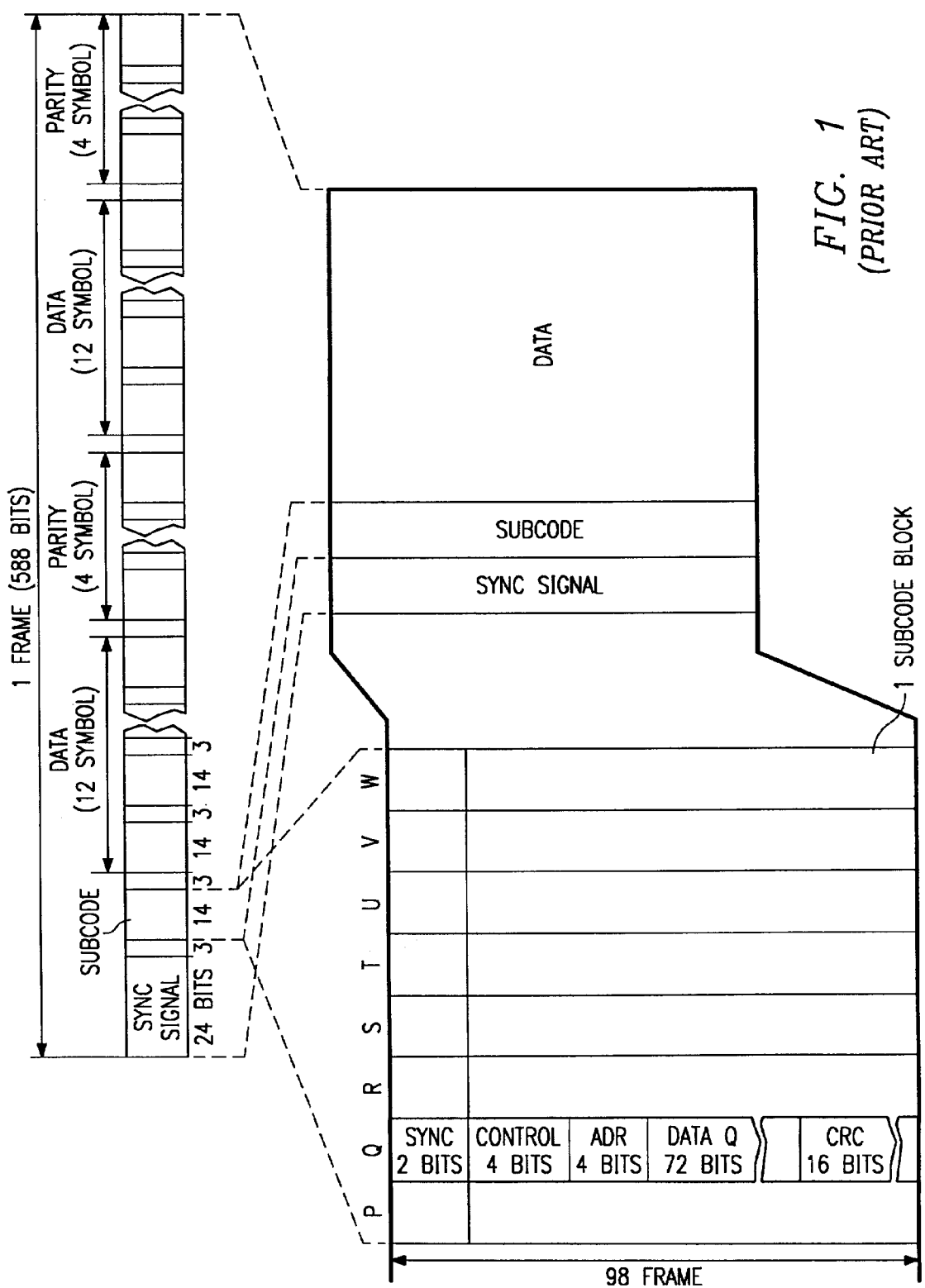
FIGS. 1 and 2 are diagrammatic representations of the format of a sector of frames of optical disk data of the prior art.
Figures 2, 4:
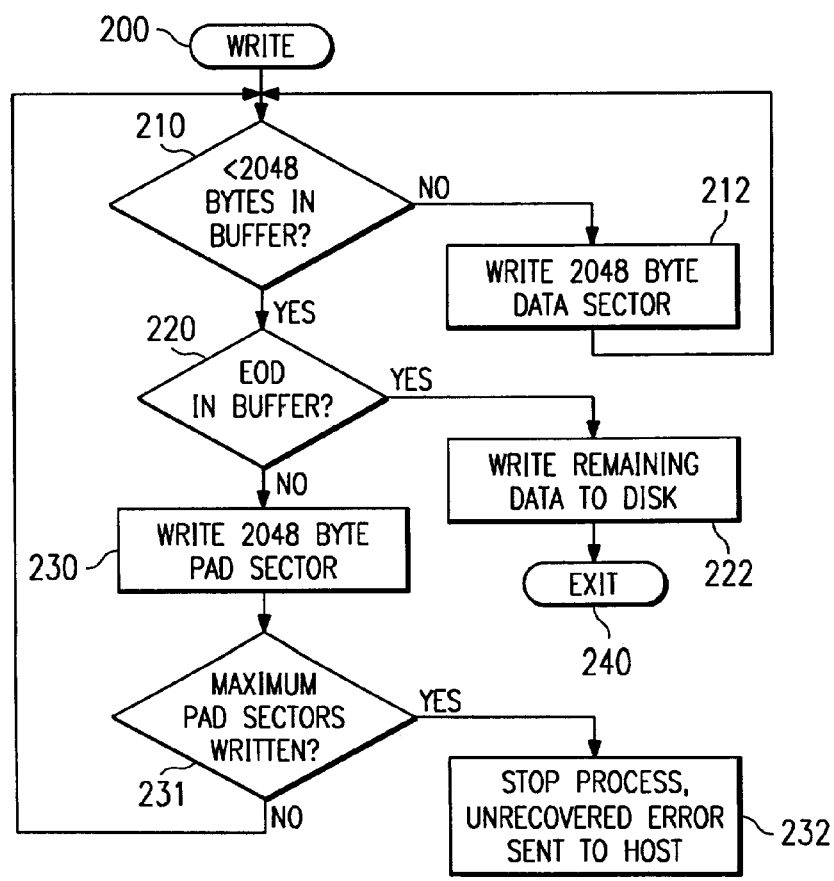
FIG. 4 is a flow chart depicting the write process of present invention.

Referring to FIGS. 1 and 2, the format of a sector of optical disk data is illustrated, as described in the 1732 patent. As discussed above, in the CD-R format, 24 of the resultant 17 bit symbols are assembled into a frame, which also includes a synch pattern and error correction data. The sector includes 98 frames grouped together and organized into a sector with a sector header across the frames comprising several channels, including the "Q" channel. A layered level of error correction is accomplished on a "diamond" or slant pattern across the frames to avoid the total loss of a frame of data, as is known in the art. Thus, each sector comprises a totality of 98 frames of data, together with a sector header, synch information and layered ECC distributed across the frames. The CD-R media does not provide molded sector or block identification marks to identify data recording positions. The sectors are therefore formatted with headers having a great deal of information to aid in synchronizing the rotation of the disk and obtaining data framing, comprising a great deal of overhead. The sector header incorporated in the Q channel of FIG. 1, illustrated in FIG. 2, indicates the sector (block) address and the mode. Identifiers and other information are provided in the other sub-header channels, as is known in the art.

The complexity of the formatting, error correction and encoding, together with the lack of position identification in the media, makes apparent the problem that occurs if an under-run occurs which results in the stoppage of writing. It may be possible to deal with the stoppage with a systems level program which may re-establish the writing process in some way. However, the writing process cannot be restarted at the drive level without incurring the space and table of contents overhead problem, resulting in a disk with the appearance of two recorded files. User applications most often cannot deal with the overhead or the two data files where only one is expected, as discussed above.

Figure 3:
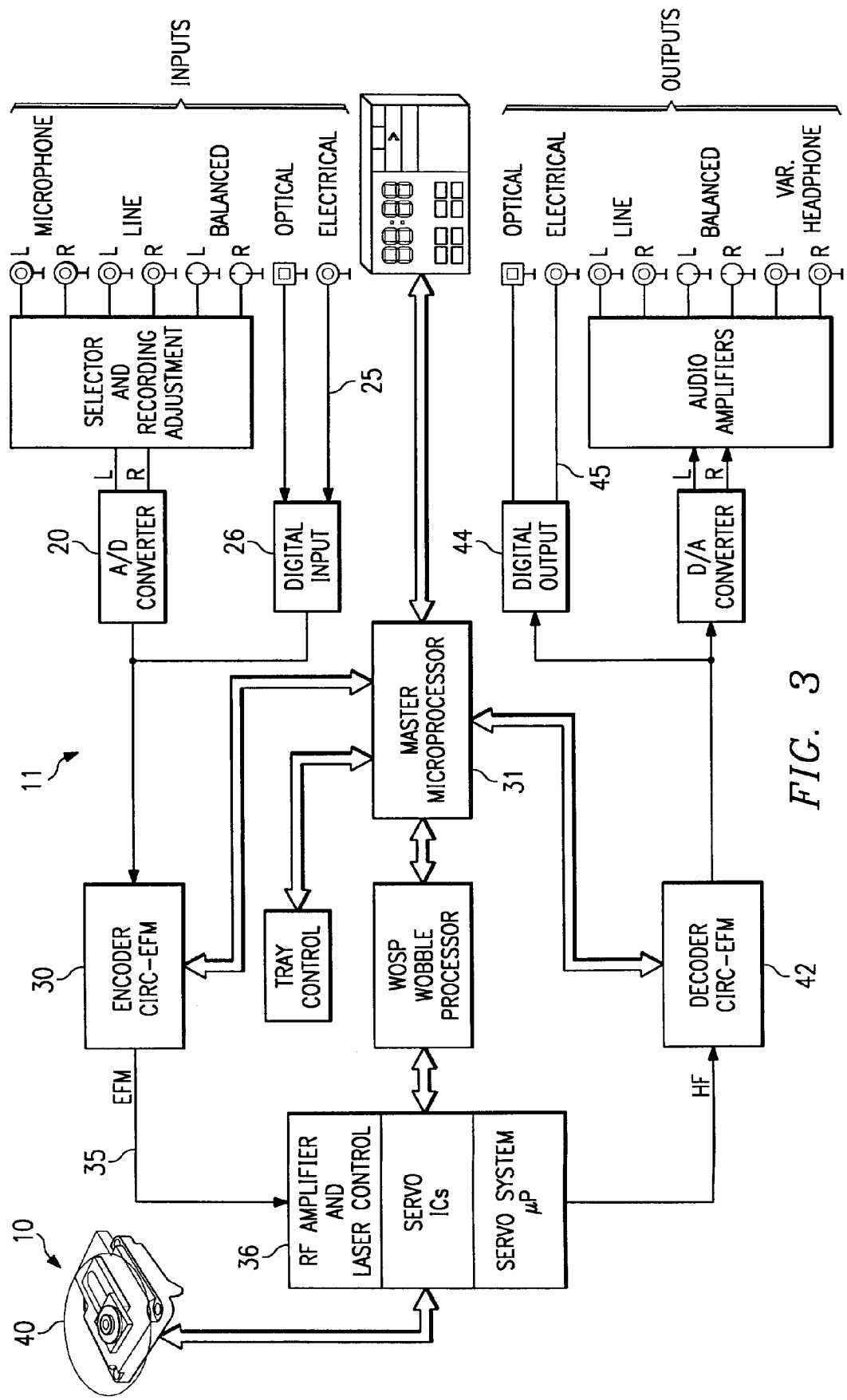
FIG. 3 is a block diagram of an optical disk and the read and write electronics for storing data in a continuous sequence of sectors of FIGS. 1 and 2, which may be utilized with the present invention.

FIG. 3 is a block diagram of an optical disk drive 10 and the read and write electronics 11 for storing data in a continuous sequence of sectors of FIGS. 1 and 2. The analog inputs provided to A/D converter 20 are continuous by definition and not subject to under-run. The inputs from a host that may be subject to under-run are provided on line 25 to digital input 26. An encoder 30, which includes a buffer, and microprocessor 31 generate the formatting, headers and ECC and organize the data into frames and sectors, as is well known in the art. The resultant EFM encoded data stream is supplied on line 35 to the laser recording and reading circuitry 36 for recording on an optical disk 40.

Data encoded on an optical disk 40 is read by the laser recording and reading circuitry 36 and provided to decoder 42 and microprocessor 31 for decoding, error correction and reorganization into output data and supplied by digital output 44 to output line 45 to a host.

FIG. 4 is a flow chart depicting the write process of the present invention for protecting against an under-run condition. In response to a write command 200, writing is initiated and decision block 210 determines whether there is less than a full sector of data in the buffer of encoder 30 of FIG. 3. A full sector of data is 2048 bytes of data. In the CD-R format, the total number of bytes to support 2048 bytes of data is 2352 bytes.

If at least a full sector's worth of data is available, "No" in decision block 210, the next sector is written to the disk in step 212 and the process cycles back to decision block 210. Upon the occurrence of an under-run, "Yes" in decision block 210, no partial sector will be written to disk unless the end of data has been reached. Thus, decision block 220 looks for an "EOD", or "end of data" character to designate the end of data to be recorded. If the "EOD" character is present, "Yes" in block 220, the data remaining in the buffer of encoder 30 is written to disk 40 in block 222 by microprocessor 31, and the process is exited in block 240.

If decision block 220 is unable to detect an "EOD" character, indicating a true under-run, a padding sector is written to the disk in step 230.

Thus, microprocessor 31 in FIG. 3 determines whether a true under-run condition exists and provides encoder 30 with the commands to write a data sector or a padding sector to the disk.

Referring again to FIG. 4, decision block 231 detects whether the maximum number of pad sectors is written to the disk, as will be explained. If "No", the process cycles back to decision block 210. Once again, if sufficient data has been provided to the buffer to write a sector by the time decision block 210 is reached, step 212 writes the sector to the disk. If, instead, a true under-run remains, step 230 writes another padding sector to the disk.

In the preferred embodiment, the padding sector will be identified by an otherwise unused bit pattern in the sub-header field or mode field of the pad sector in the Q channel of FIG. 2. Any fill character may be used for the padding data field, since the data will be bypassed, as will be explained. A special "MODE SELECT" command may be used to select the fill character.

It is not useful to write a full disk of padding sectors if a communication failure has occurred to the input data channel. Therefore, a number of padding sectors is selected as the maximum to be written. The decision block 231 is provided for this purpose. If the maximum number of sectors has been reached, "Yes", the writing of padding sectors is stopped in step 232 and the process abends. At this point, an unrecoverable "Pad Sector Under-run" error signal is sent to the host. Alternatively, the signal may be called a permanent "Pad Sector Under-run" error.

Thus, the process of the invention is to either write entire sectors of data or entire sectors of padding. The sectors are differentiated from one another by the information in the mode or sub-header field.

FIG. 5 illustrates the read process, entered at step 300, and conducted by the microprocessor 31 and decoder 42 of FIG. 3. The first step is to read the mode or sub-header information for the next sector to be read in step 310. Step 320 checks the mode/sub-header information to see if the present sector is a data or pad sector. If the sector is a data sector, "Yes", the data sector is read in step 321 and transferred to the host. Then, a check is made in step 322 to determine if all the data has been read, per instructions from the host. For example, in the SCSI environment, the number of sectors to be read is defined in a read command. If there is more to be read, the process loops back to step 310. Otherwise, the read process successfully exits in step 340.

If the sector is identified as a padding sector in decision block 320, the padding sector is read at step 330 at the drive, but the padding data is not transferred to the host in step 331. The padding sector is needed by the drive to maintain the ECC process, but is valueless to the host. Thus, at step 331, microprocessor 31 in FIG. 3 operates decoder 42 to comprise a gate which transmits the data of a data sector at digital output 44 on line 45 to the host, and which blocks the padding data from being transferred to the host.

The process then cycles back to step 310 to check the next sector.

An alternative embodiment to the format of the present invention is illustrated in FIG. 6 which does not use the special MODE character and which enables existing CD-ROM drives to utilize the invention. Specifically, the pad header 400 would use a minimum (00000), maximum (FFFFF), or negative address in the address portion of the header, an address significantly different than the address expected by the drive, such that the drive would bypass the information being read per step 330 of FIG. 5.

The MODE SELECT command may still be used to record the special mode character for new CD-R drives.

An exemplary MODE SELECT command is illustrated in FIG. 7. Bit 1 of byte 0 allows the user to define whether the pad sectors are to be used during under-run conditions. Byte 1 defines the character to be used as pad during the under-run. Allowing the padding sector to be changed allows for future enhancements. Alternatively, a different padding sector could result in using different padding characters for each session or when there is a need to differentiate between the units processed or the drives. Bytes 2 and 3 define the maximum number of pad sectors to be written before terminating the write operation in steps 231 and 232 in FIG. 4. This termination of the write operation should be a low priority event through the use of pad sectors.

Alternatively, a standards group may define the character to be used to identify padding sectors, and, if not a mode character, the MODE SELECT command would not be used.

When an under-run occurs where the limit on pad sectors has not been reached, the device notifies the host with a recovered error code, "Pad Sector Under-run". Alternatively, the signal may be called a temporary "Pad Sector Under-run" error. The host may then interrogate the drive, requesting error statistics such as the number of pad sectors written or the number of tracks padded. This information could also be written on the disk for future reference.

Thus, it has been disclosed that the stoppage of the write process and the possible resultant discard of an optical disk as the result of an under-run condition may be avoided by providing a limited number of padding sectors. The padding sectors may be identified in the control area of the sector (the address, subheader, and/or mode field), so as to be identified in the read process and the sector used for the purpose of ECC by the drive, but blocked from transfer to the host. Also, the existing MODE SELECT command may be utilized to invoke the padding sector function, select the padding character to allow different characters to be used, and define the maximum number of padding sectors to be written before terminating the write operation.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a continuous sector data storage device for reading stored data and transferring said stored data to a host, said stored data formatted into sectors having headers, said device having an ECC process, an apparatus comprising:

a read padding detector responsive to said sector headers for detecting a padding sector of padding data; and a data transfer gate responsive to said detection of a padding sector of padding data to maintain said ECC process for reading said sector of padding data and not transferring said padding sector of padding data to said host.

2. An optical data storage device for reading data stored on a removable optical disk, which data is stored in a sequence of sectors, said data formatted into sectors having headers, said device having an ECC process, and for transferring said stored data to a host, comprising:

a read padding detector responsive to said sector headers for detecting a padding sector of padding data; and a data transfer gate responsive to said detection of a padding sector of padding data for reading said padding sector of padding data to maintain said ECC process and not transferring said padding sector of padding data to said host.

* * * * *